(12) United States Patent
Pollard, Sr.

(10) Patent No.: US 7,739,937 B2
(45) Date of Patent: Jun. 22, 2010

(54) BAND SAW BLADE GUIDE

(76) Inventor: Albert Clarkson Pollard, Sr., P.O. Box 266, Irvington, VA (US) 22480

( * ) Notice: Subject to any disclaimer, the term of this patent is extended or adjusted under 35 U.S.C. 154(b) by 103 days.

(21) Appl. No.: 11/414,934

(22) Filed: May 1, 2006

(65) Prior Publication Data

US 2007/0251371 A1 Nov. 1, 2007

(51) Int. Cl.
*B26D 1/54* (2006.01)
(52) U.S. Cl. .......................... 83/820; 83/821
(58) Field of Classification Search ............... 83/820, 83/829, 821, 823, 807, 808, 809
See application file for complete search history.

(56) References Cited

U.S. PATENT DOCUMENTS

| | | | | |
|---|---|---|---|---|
| 284,007 A | * | 8/1883 | Harrison | 83/829 |
| 315,229 A | * | 4/1885 | Black | 83/829 |
| 365,441 A | | 6/1887 | Larsh | |
| 425,105 A | * | 4/1890 | McChesney | 83/824 |
| 1,474,255 A | | 11/1923 | Gillaspy | |
| 1,760,577 A | | 5/1930 | Bishop | |
| 1,892,470 A | * | 12/1932 | Pragerstorfer | 83/169 |
| 2,152,906 A | | 4/1939 | Miller | |
| 2,250,324 A | | 7/1941 | Baker | |
| 2,311,426 A | * | 2/1943 | Wilkie | 83/826 |
| 2,601,095 A | | 6/1952 | Crane | |
| 2,726,688 A | * | 12/1955 | Flood | 83/169 |
| 2,782,811 A | * | 2/1957 | Johnson | 83/820 |
| 2,850,053 A | | 9/1958 | Voss | |
| 2,914,101 A | * | 11/1959 | Blum | 83/823 |
| 2,934,106 A | * | 4/1960 | Chapman et al. | 83/820 |
| 2,986,181 A | | 5/1961 | Carter | |
| 3,220,446 A | | 11/1965 | Burkey | |
| 3,643,536 A | | 2/1972 | Alexander | |
| 3,872,762 A | * | 3/1975 | McKillip et al. | 83/820 |
| 4,258,601 A | | 3/1981 | Tanabe | |
| 4,309,930 A | * | 1/1982 | Wright | 83/820 |
| 5,119,705 A | | 6/1992 | Rosenberger | |
| 6,463,836 B1 | | 10/2002 | Snodgrass, Jr. | |

* cited by examiner

*Primary Examiner*—Ghassem Alie

(57) ABSTRACT

A band saw blade guide includes a cylindrical chisel shaped member mounted at an oblique angle to a band saw blade. The blade guide adjusts the angle of the band saw blade by rotation of the guide about its axis. By rotating the guide about its axis, the angle of the chisel point guiding surface is changed thereby changing the angle of the blade. Further the blade may be guided by a single guide forced against one surface of the blade thereby eliminating the need for guides on both sides of the blade.

4 Claims, 4 Drawing Sheets

BAND SAW BLADE GUIDE

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to adjustable guides used to maintain the position of a band saw blade fixed relative to the band saw.

2. Background of the Invention

Band saws have been around for years and various schemes have been devised to guide the band saw blade so that the surfaces of the blade are held parallel to the direction of feed of the material being cut. The most common scheme uses guiding members such as a bearing or block of material that bears against the sides of the blades. These schemes have limited adjustment. The position of the guide member is typically adjustable such that it may be adjusted closer or further away from the blade by an adjustment mechanism and also adjusted so that the edge of the guide member is closer to the teeth of the blade or further away from the teeth of the blade. Typically no adjustment is provided for the angle of the blade. The angle of the blade is typically fixed by the accuracy of the manufacture of the guide member. This lack of adjustment for the angle of the surface of the guide member requires both accuracy in manufacture of the guide mechanism and also requires replacement of the guide after it wears beyond acceptable limits.

Guides of prior art are provided on both sides of the blade in order to fully restrict the movement of the blade in the manner in which these guide members are used.

3. Objects and Advantages

The object and advantage of the present invention are several fold. Specifically:
(a) The present invention provides for a single simple adjustment to move a blade guide towards or away from a band saw blade and also to guide the angle of the blade.
(b) The present invention allows for the use of a single guiding member only on one side of the blade.
(c) The present invention allows for adjustment to compensate for inaccuracies in manufacture of the blade guide mechanism.
(d) The present invention allows for adjustment to compensate for wear of the blade guide.

Further objects and advantages of the present invention will become apparent from the following descriptions and drawings.

SUMMARY

In accordance with the present invention a band saw blade guide comprises a blade guide member formed in the shape of a cylindrical rod with a chisel point. This blade guide member is held in a grove at an oblique angle to a side of the blade. A clamping means is provided to hold the blade guide member in a fixed position in the grove once the optimal fixed position is determined. A means is provided to facilitate rotation of the guide member. In use the guide member is pressed against the blade and rotated such that the chisel point of the blade holds the blade in the desired position.

DRAWINGS

Figures

In the drawings, closely related figures have the same numbers but different alphabetic suffixes.

REFERENCE NUMERALS

Figure 1:
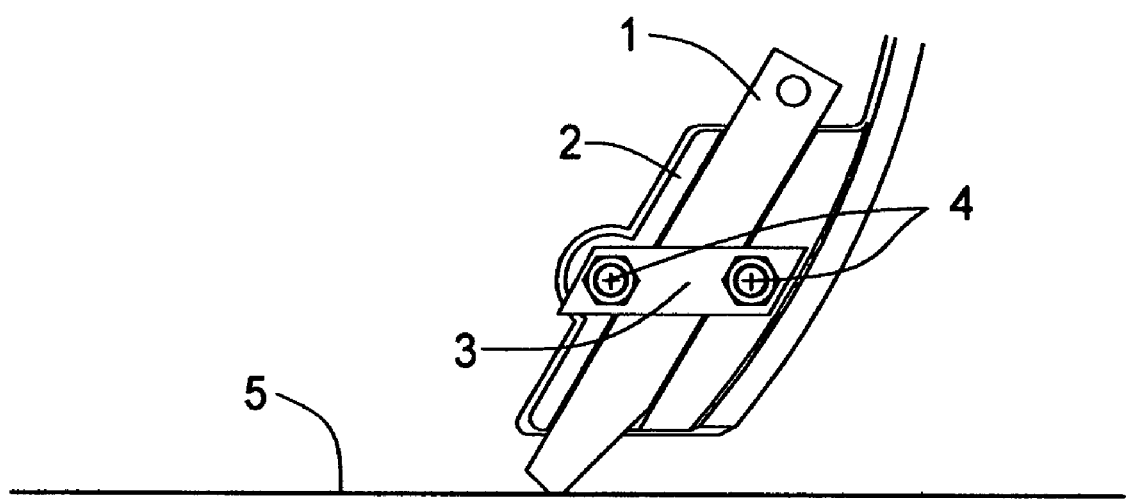
FIG. 1 shows a blade guide in its blade guide holder with associated blade guide clamping bar and clamping bolts.

1 Blade guide
2 Blade guide holder
3 Blade guide clamping bar
4 Blade guide clamping bolts
5 Blade
6 Band saw assembly
7 Guide end of blade guide
8 Adjustment hole
9 Wheel
10 Bearing

DETAILED DESCRIPTION

Figure 2:
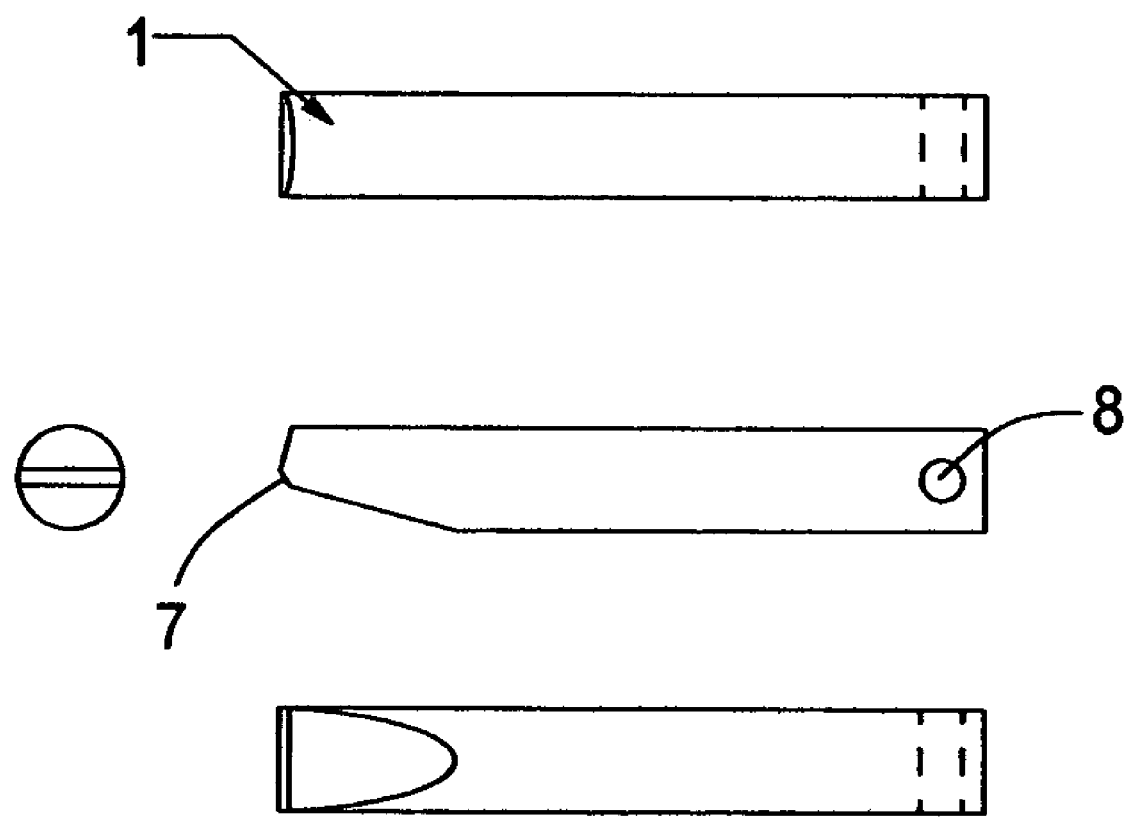
FIG. 2 illustrates 4 views of the blade guide.
Figure 3:
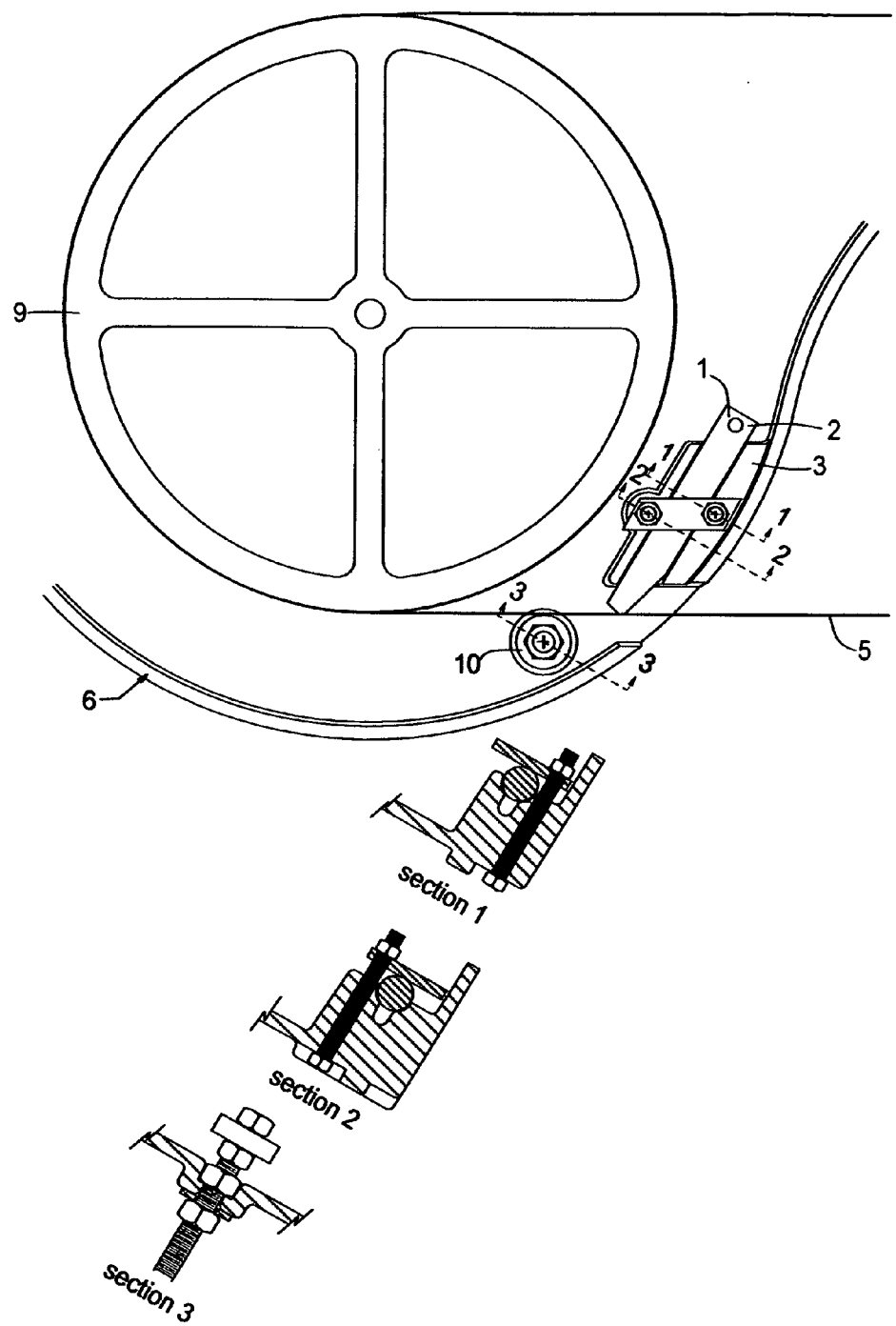
FIG. 3 shows a portion of the entire band saw assembly with the associated band saw parts.

The blade guide 1 of the preferred embody is illustrated in FIG. 1. The blade guide 1 is held in blade guide holder 2 by blade guide clamping bar 3. Clamping bar 3 is held firmly against the blade guide 1 by clamping bolts 4. The details of the blade guide 1 are shown in FIG. 2. FIG. 2 illustrates the blade guide 1 in four standard orthogonal views of a mechanical drawing. The Blade guide 1 is fabricated from a cylindrical rod of a material such as brass, which is strong yet softer than the steel from which a band saw blade is made. The diameter of the rod is less than the width of the blade. The guide end 7 is fashioned to a chisel shape as illustrated. Adjustment hole 8, in the opposite end of the blade guide from the guide end of the blade guide, receives a tool used to rotate the blade guide about its axis during adjustment of the blade guide. FIG. 3 shows a portion of the entire saw assembly 6 with the interrelation of parts. Wheel 9 supports the blade 5. Bearing 10 prevents the blade 5 from being pushed off of wheel 9 when the blade 5 is advanced through material being cut. Blade guide 1 is in a grove of holder 2 and is held against the blade 5 by clamping bar 3. Clamp bolts 4 hold the clamp bar 3 securely in place.

Before going on to how adjustments are made to the blade guide, a discussion of details of a band saw is in order. Typically a wheel of a band saw as illustrated by wheel 9 in FIG. 3 does not have the surface on which blade rides formed as the surface of a cylinder. That is, the surface is not cut parallel to the axis of the wheel. Typically the surface is rounded like the tread surface of a donut shaped tire. Some designs have the surface on which the blade ride cut as the surface of a truncated cone, that is the surface is cut at an angle to the axis of the wheel. The purpose of these shapes is to cause the blade to stay on the wheel as the wheel rotates. These shapes are very effective in keeping the blade on the wheel. However these wheel shapes result in the blade not being supported their full width by the wheel. For instance, with the cone shaped wheel surface the blade is supported by the larger end of the truncated cone surface or typically the edge of the blade away from the teeth of the blade. Because of these shapes, the wheel alone cannot properly support the blade. In the cone shaped wheel surface described above the edge of the blade away from the teeth is put under greater tension the tooth edge of the blade and consequently receive less support from the wheel. Because the tooth edge of the blade is not supported as well as the back of the blade, the blade has a tendency to wonder as the blade cuts through material. Because of this problem blade guides as discussed under prior art have been used. The blade guides of prior art support on both sides of the blade to hold the blade parallel to direction of cut. The inventor has discovered that two blade guides are unnecessary. One blade guide will properly support the blade provided that the blade guide has force against the blade. That is, force of the blade against the guide will hold the blade in alignment with the single blade guide, and thus parallel to the direction of cut of the blade. Furthermore, the inventor has discovered that very little force of the blade guide against the blade is necessary to hold the blade in alignment.

Accordingly, one novel principle incorporated into the present invention is that a single blade guide forced against the blade will guide the blade.

A second novel principle is also incorporated into the present invention. Before proceeding to this principle, some background is necessary. The inventor desired to have the band saw assembly 6 as illustrated in FIG. 3 made by means of sand casting. Sand casting does no lend itself to great accuracy in manufacture. As a consequence, a means of adjustment of the angle of the blade guide was necessary. To state the problem another way, if a typical square in cross section blade guide had been used, there would be the possibility the imperfection in sand casting would cause the rectangular blade guide to be out of the desired alignment with its desired position. This misalignment could result from any crude manufacturing process and could also result from wear of the blade guide. Thus, as will be seen from the following discussion, the present invention provides adjustment of the angle of the blade guide.

Figure 4A:
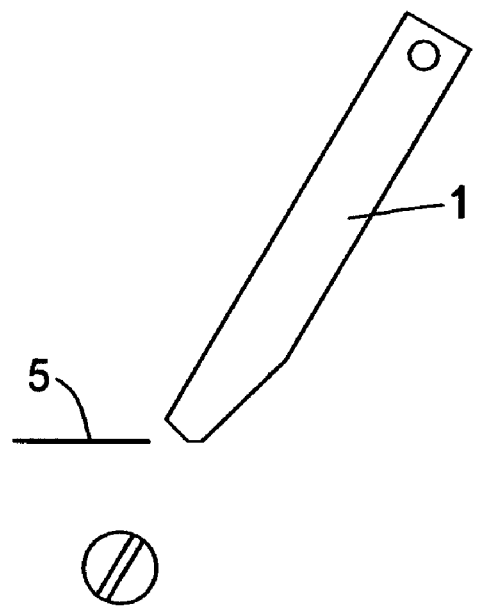
FIGS. 4A and 4B illustrate the geometry of the blade guide with two different adjustment positions.
Figure 4B:
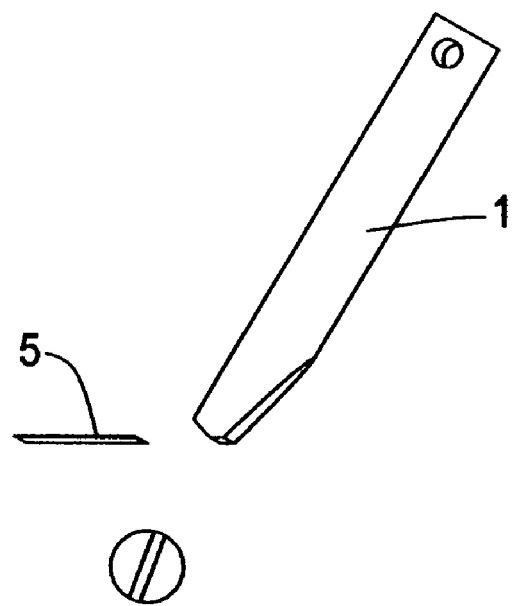

FIGS. 4A and 4B illustrate how the geometry of the blade guide 1 achieves the desired adjustment of the blade. In both figures only a portion of blade 5 is illustrated so as not to obstruct the view of the flat guide 7 of the blade guide. The blade guide 1 is mounted at an oblique angle to the blade 5. In the illustration this angle is approximately 60 degrees. Next referring to FIG. 4A, the blade guide 1 is illustrated so that the viewer sees only the edge of the blade 5. In other words the blade is adjusted so that the surface of the blade is perpendicular to the drawing surface. Next, assume that the angle of the blade 5 illustrated in FIG. 4 is not the desired blade position, but it is desired to position the blade so that the surface of the blade is not perpendicular to the drawing surface. FIG. 4B illustrates the blade guide having been rotated approximately ten degrees about its axis. This rotation of the blade guide 1 has resulted in the guiding surface being approximately five degrees to the drawing surface. The resulting position of the blade 5 as illustrated in FIG. 4B is approximately five degrees to the drawing surface. If some problem due to a defect in manufacture or wear of the blade guide caused the blade not to be in the desired position, rotation of the blade guide will correct the problem. This principle of rotation of a blade guide with the geometry shown is the second novel feature of the present invention.

Referring back to FIG. 3, the process of adjustment of the blade guide is as follows:

The blade 5 is mounted on wheel 9 as illustrated. The blade guide 1 is initially positioned so that it is not in contact with the blade 5. The wheel 9 is caused to rotate and other adjustments not directly involved with the present invention are made. After adjustments are made so that the blade properly tracks on the wheel 9, the blade guide 1 may be adjusted. For safety reasons, without wheel 9 rotating blade guide adjustments are made. With clamp bolts 4 loosen, the blade guide 1 is pressed against the blade 5. Simultaneously the blade guide 1 is rotated through the use of a tool inserted into hole 8 until the blade is in the desired position. Clamp bolts 4 are then tightened to hold the blade guide 1 in place.

The inventor has illustrated the preferred embodiment of the invention. Other embodiments of the invention could be devised utilizing the novel principles as explained above. Such embodiments would fall within the scope and spirit of the present invention. Further, the inventor has made statements about blade tension and wheel geometry as his present understanding of principles involved, however the inventor does not wish to be held to these because the point is: the blade guide of the present invention gives the desired results in the guiding the blade of a band saw blade.

I claim:

1. A band saw comprising: a blade; and a blade guide mechanism for controlling the blade angle, said blade guide mechanism comprising:
    (a) a blade guide member of cylindrical shape with a flat wedge-shaped tip formed at an end, wherein said flat wedge shape tip intersects another wedge surface of the blade guide;
    (b) a blade guide holder with a blade guide groove for receiving said blade guide member, said blade guide member is axially slid and rotated in said blade guide groove with said wedge shape bearing against said blade, said blade guide groove being at an oblique angle to the length direction of said blade,
    (c) means for securing said blade guide member in said blade guide groove,
    whereby said blade guide member is slid against said blade, rotated about a longitudinal axis of the blade guide member and secured in said blade guide groove, thereby the rotation of said blade guide member, adjusts the blade angle with respect to a direction of cut so that the blade is parallel to the direction of cut of said blade.

2. The band saw of claim 1 wherein said blade guide member is made from brass.

3. The band saw of claim 1 wherein said blade guide member has a radial hole thereby facilitating, with the use of a tool, rotation of said blade guide member in said blade guide groove.

4. The band saw of claim 1 wherein said means for securing blade guide member in said groove includes a rigid member across said blade guide member positioned so that said blade guide member is held captive between said rigid member and said blade guide groove.

* * * * *